(12) United States Patent
Reilhac

(10) Patent No.: US 9,174,650 B2
(45) Date of Patent: Nov. 3, 2015

(54) DRIVER ASSISTANCE SYSTEM FOR A VEHICLE, VEHICLE HAVING A DRIVER ASSISTANCE SYSTEM, AND METHOD FOR ASSISTING A DRIVER IN DRIVING A VEHICLE

(75) Inventor: Patrice Reilhac, Esslingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 900 days.

(21) Appl. No.: 13/395,961

(22) PCT Filed: Sep. 21, 2010

(86) PCT No.: PCT/EP2010/005766
§ 371 (c)(1),
(2), (4) Date: Mar. 14, 2012

(87) PCT Pub. No.: WO2011/035880
PCT Pub. Date: Mar. 31, 2011

(65) Prior Publication Data
US 2012/0169526 A1  Jul. 5, 2012

(30) Foreign Application Priority Data
Sep. 25, 2009  (DE) .......................... 10 2009 048 493

(51) Int. Cl.
*G01S 13/91* (2006.01)
*G01S 13/93* (2006.01)
(Continued)

(52) U.S. Cl.
CPC ........... *B60W 50/0098* (2013.01); *G01C 21/36* (2013.01); *G01S 13/91* (2013.01); *G01S 13/93* (2013.01); *G08G 1/012* (2013.01); *G08G 1/0962* (2013.01); *B60W 50/14* (2013.01)

(58) Field of Classification Search
CPC ..... G01S 13/91; G01S 13/93; G01S 2013/91; G01S 2013/9321; G01S 2013/936; G01C 21/36; G01C 21/3602; G01C 21/3664; G08G 1/0962; G08G 1/096855; G08G 1/096877; G08G 1/096883
USPC ...................... 342/70–72; 701/24, 36, 45, 70, 701/116–122, 31.4, 31.5, 33.2, 408, 701/418–455, 537
See application file for complete search history.

(56) References Cited

U.S. PATENT DOCUMENTS 6,116,639 A * 9/2000 Breed et al. .................... 280/735
6,400,308 B1 * 6/2002 Bell et al. ......................... 342/71
(Continued)

FOREIGN PATENT DOCUMENTS

DE  102004008867 A1  9/2004
DE  102008000570 A1  9/2009
(Continued)

OTHER PUBLICATIONS

International Search Report issued in PCT/EP2010/005766, mailed on Dec. 3, 2010, with translation, 4 pages.

*Primary Examiner* — Peter Bythrow
(74) *Attorney, Agent, or Firm* — Osha Liang LLP

(57) ABSTRACT

The invention relates to a driver assistance system for a vehicle (1), wherein the driver assistance system has at least one controller (2, 4, 6, 9, 11, 14) installed in the vehicle (1) and/or at least one sensor device (16, 17, 18, 19) installed in the vehicle (1), wherein the at least one controller (2, 4, 6, 9, 11, 14) and/or the at least one sensor device (16, 17, 18, 19) has a communication interface (21) which can be used to transmit data directly between the controller (2, 4, 6, 9, 11, 14) and/or the sensor device (16, 17, 18, 19) and a portable communication appliance (22) at least in one direction by bypassing a data transmission system (20) inside the vehicle, wherein the data transmission causes the portable communication appliance (22) and the controller (2, 4, 6, 9, 11, 14) and/or the sensor device (16, 17, 18, 19) to interact such that at least one function can be performed which assists a driver in driving the vehicle (1). The invention also relates to a vehicle (1) and to a method for assisting a driver in driving a vehicle (1).

29 Claims, 1 Drawing Sheet

(51) Int. Cl.
*G01C 21/36* (2006.01)
*G08G 1/01* (2006.01)
*G08G 1/09* (2006.01)
*B60W 50/00* (2006.01)
*G08G 1/0962* (2006.01)
*B60W 50/14* (2012.01)

(56) References Cited

U.S. PATENT DOCUMENTS

| | | | | |
|---|---|---|---|---|
| 6,412,813 | B1* | 7/2002 | Breed et al. | 280/735 |
| 6,553,308 | B1* | 4/2003 | Uhlmann et al. | 701/455 |
| 6,622,083 | B1* | 9/2003 | Knockeart et al. | 701/533 |
| 6,736,231 | B2* | 5/2004 | Breed et al. | 180/272 |
| 6,754,183 | B1* | 6/2004 | Razavi et al. | 370/254 |
| 6,820,897 | B2* | 11/2004 | Breed et al. | 280/735 |
| 6,847,487 | B2* | 1/2005 | Burgner | 359/630 |
| 6,895,233 | B2* | 5/2005 | Chen et al. | 455/345 |
| 6,943,723 | B2* | 9/2005 | Kim et al. | 342/20 |
| 7,301,494 | B2* | 11/2007 | Waters | 342/20 |
| 7,427,929 | B2* | 9/2008 | Bauer et al. | 340/905 |
| 7,592,945 | B2* | 9/2009 | Colburn et al. | 342/70 |
| 8,594,654 | B2* | 11/2013 | Weyl et al. | 455/420 |
| 8,929,824 | B2* | 1/2015 | Oh et al. | 455/41.2 |
| 2002/0105481 | A1* | 8/2002 | Kanevsky et al. | 345/7 |
| 2003/0006888 | A1* | 1/2003 | Burchette et al. | 340/425.5 |
| 2003/0134660 | A1* | 7/2003 | Himmel et al. | 455/557 |
| 2004/0233045 | A1* | 11/2004 | Mays | 340/425.5 |
| 2005/0093735 | A1* | 5/2005 | Samukawa et al. | 342/70 |
| 2005/0190041 | A1* | 9/2005 | Sahai | 340/5.72 |
| 2005/0195383 | A1* | 9/2005 | Breed et al. | 356/4.01 |
| 2005/0221805 | A1* | 10/2005 | Koyano | 455/414.2 |
| 2005/0288860 | A1* | 12/2005 | Pair et al. | 701/213 |
| 2006/0089793 | A1* | 4/2006 | Rudow et al. | 701/208 |
| 2006/0095195 | A1* | 5/2006 | Nishimura et al. | 701/96 |
| 2007/0182528 | A1* | 8/2007 | Breed et al. | 340/435 |
| 2007/0207797 | A1* | 9/2007 | Pitt et al. | 455/422.1 |
| 2007/0291664 | A1* | 12/2007 | Weyl et al. | 370/254 |
| 2008/0169966 | A1* | 7/2008 | Tsuchihashi et al. | 342/70 |
| 2008/0174414 | A1* | 7/2008 | McCarthy et al. | 340/425.5 |
| 2008/0278298 | A1* | 11/2008 | Waeller et al. | 340/425.5 |
| 2009/0072996 | A1* | 3/2009 | Schoepp | 340/903 |
| 2009/0172527 | A1* | 7/2009 | Buecker et al. | 715/700 |
| 2009/0201192 | A1* | 8/2009 | Tokoro et al. | 342/70 |
| 2009/0215488 | A1* | 8/2009 | Causey et al. | 455/556.1 |
| 2009/0237293 | A1* | 9/2009 | Sakuma | 342/146 |
| 2009/0287412 | A1* | 11/2009 | Menzel et al. | 701/213 |
| 2010/0001897 | A1* | 1/2010 | Lyman | 342/70 |
| 2010/0066587 | A1* | 3/2010 | Yamauchi et al. | 342/70 |
| 2010/0125407 | A1* | 5/2010 | Cho et al. | 701/201 |
| 2011/0054716 | A1* | 3/2011 | Stahlin et al. | 701/1 |
| 2014/0106726 | A1* | 4/2014 | Crosbie et al. | 455/418 |

FOREIGN PATENT DOCUMENTS

| | | |
|---|---|---|
| EP | 1580092 A2 | 9/2005 |
| WO | 2006/063603 A1 | 6/2006 |

\* cited by examiner

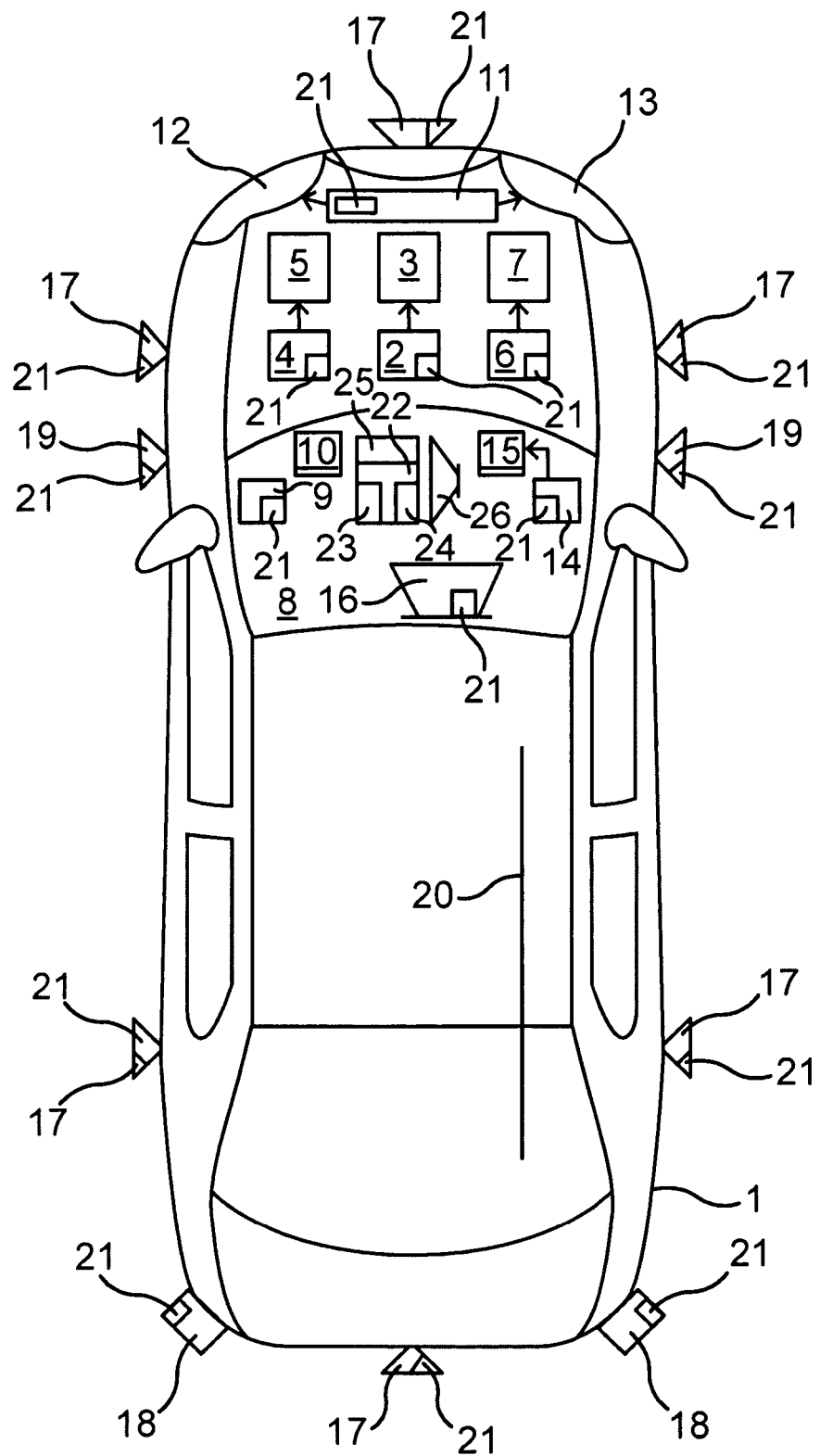

DRIVER ASSISTANCE SYSTEM FOR A VEHICLE, VEHICLE HAVING A DRIVER ASSISTANCE SYSTEM, AND METHOD FOR ASSISTING A DRIVER IN DRIVING A VEHICLE

The invention relates to a driver assistance system for a vehicle. The driver assistance system comprises at least one controller installed in the vehicle and/or at least one sensor device installed in the vehicle. The invention also relates to a vehicle having such a driver assistance system and to a method for assisting a driver in driving a vehicle using a driver assistance system which has at least one controller installed in the vehicle and/or at least one sensor device installed in the vehicle.

Modern vehicles have driver assistance systems which assist the driver in driving the vehicle. The driver assistance systems usually comprise at least one controller which is installed in the vehicle and which is used to actuate a component of the vehicle—for example a brake and/or a headlamp and/or an air-conditioning system and/or a steering apparatus. Driver assistance systems may also have at least one sensor device which has been factory-installed in the vehicle and which is then used to capture data pertaining to the surroundings of the vehicle. By way of example, driver assistance systems today have radar appliances, ultrasonic sensors, cameras and similar sensor devices. In current vehicles, controllers communicate with one another via various communication buses (CAN, LIN, MOST, Flexray). The sensor devices also transmit the data that are obtained via the communication buses. In order to ensure the interoperability of the different controllers in the different variants of different vehicle models, particular software features are usually prescribed for all controllers. The aim of such standard software features is reliable networking and integration of all controllers and all sensor devices to form an overall system.

The feature variants of a vehicle model may differ in terms of the applications which are provided by the respective driver assistance systems. The applications provided by the driver assistance systems in different feature variants may differ from one another even if the same controllers and/or the same sensor devices are used in the different feature variants. By way of example, different feature variants can be equipped with the same front camera for capturing a surrounding area in front of the vehicle; the applications and functions provided by the respective driver assistance systems using the image data from the front camera may be different. Specifically, in one feature variant, the image data from the front camera can be used to provide an application according to which the driver is warned about driving over a recognised road marking, while in another feature variant the image data from the front camera are used to provide an application according to which a headlamp on the vehicle is actuated on the basis of a level of brightness in the surroundings which is ascertained using the image data. It is complicated for the driver to subsequently upgrade the driver assistance system in his vehicle with additional applications. The driver would then need to have a new software version installed on the respective controllers and/or the sensor devices or to have the controllers and/or the sensor devices upgraded accordingly. It is therefore a particular challenge to take measures which allow the driver to later configure his driver assistance system himself—without interfering with the controllers and/or sensor devices which are in the vehicle.

The document DE 10 2004 008 867 A1 describes an image processing system for a vehicle. The image processing system comprises a camera system which can be used to record image data pertaining to surroundings of the vehicle or about an interior. A miniature computer—for example a videophone or a portable personal computer (personal digital assistant)—undertakes the processing of the image data in this case. A screen on the miniature computer can be used to display images which are based on the image data obtained. The image processing system, including the miniature computer and the camera system, is part of a driver assistance system installed in the vehicle.

It is an object of the invention to demonstrate a solution to how a driver of a vehicle can extend the functionality of a driver assistance system installed in the vehicle without great complication.

The invention achieves this object by means of a driver assistance system having the features according to Patent Claim 1, by means of a vehicle having the features of Patent Claim 29 and by means of a method having the features according to Patent Claim 30. Advantageous embodiments of the invention are the subject matter of the dependent patent claims and the description.

A driver assistance system according to the invention for a vehicle comprises at least one controller installed in the vehicle and/or at least one sensor device installed in the vehicle. By way of example, the controller may be designed for actuating a component of the vehicle; the sensor device may be designed for recording data pertaining to vehicle surroundings, for example. The at least one controller and/or the at least one sensor device has/have a communication interface which can be used to transmit data directly between the controller and/or the sensor device and a portable communication appliance at least in one direction by bypassing a data transmission system inside the vehicle—for example a vehicle bus—, wherein the data transmission causes the portable communication appliance and the controller and/or the sensor device to interact such that at least one function can be performed which assists a driver in driving the vehicle.

The invention therefore provides the data to be able to be transmitted between the controller installed in the vehicle and/or the sensor device and a portable communication appliance irrespective of the vehicle architecture—that is to say irrespective of any data transmission systems which are present in the vehicle. By way of example, the at least one controller and/or the at least one sensor device may furthermore also be connected to the data transmission system inside the vehicle, as a result of which said controller and/or said sensor device can additionally communicate with the portable communication appliance by bypassing said data transmission system—namely via the additional communication interface. This means that the at least one controller and/or the at least one sensor device is operational, or can provide a function in the driver assistance system which assists the driver in driving the vehicle, even without the portable communication appliance. In other words, just the at least one controller and/or the at least one sensor device can provide a function for driver assistance on the basis of a data transmission via the data transmission system inside the vehicle; the function which can be performed by virtue of the interaction of the portable communication appliance with the at least one controller and/or the at least one sensor device is an additional function.

The at least one controller and/or the at least one sensor device are particularly components which are already present in the vehicle at the factory—that is to say when the vehicle is delivered. Therefore, the at least one controller and/or the at least one sensor device cannot be removed from the vehicle again by the driver without effort.

The respective communication interface in the at least one controller and/or the at least one sensor device may already be present at the factory. Alternatively, provision may be made for the at least one controller and/or the at least one sensor device to be upgraded with the respective communication interface at a later time.

The driver assistance system according to the invention allows the driver to expand the functionality of the driver assistance system at a later time by himself without much effort and to configure the driver assistance system himself. The driver merely needs a portable communication appliance—for example a mobile telephone and/or a portable personal computer (personal digital assistant). He can install on his portable communication appliance a computer program which, when executed, involves the transmission of data between the portable communication appliance and the at least one controller and/or the at least one sensor device, as a result of which the driver is assisted in driving the vehicle. By way of example, the driver is able to download different program codes for different supplementary functions of the driver assistance system from the Internet and to install and execute them on the portable communication appliance. The provision of a communication interface for the controller and/or the sensor device means that the data transmission systems which are present in the vehicle are not additionally loaded. The reason is that the communication between the portable communication appliance and the controller and/or the sensor device takes place directly, preferably wirelessly.

As already explained, the communication interface can be used to transmit data directly between the controller and/or the sensor device and a mobile telephone and/or a portable personal computer (personal digital assistant). The driver therefore merely requires a mobile telephone or a portable personal computer in order to expand the functionality of his driver assistance system. By way of example, he can mount the portable communication appliance in the interior on a windscreen of the vehicle using a bracket, as a result of which he can also see a display device of the portable communication appliance. Mobile telephones and portable personal computers usually have communication interfaces which are suitable for wireless communication. The at least one controller and/or the at least one sensor device therefore merely needs to be equipped with an appropriate communication interface in order to interchange data with and interact with a portable communication appliance. Furthermore, mobile telephones, and also portable personal computers, are available in a wide range of forms on the market. If the driver already has a mobile telephone, for example, then he merely needs an appropriate computer program in order to be assisted in driving the vehicle by virtue of the interaction of his mobile telephone with the controller and/or the sensor device.

It has been found to be particularly advantageous if the communication interface is designed for wireless transmission. In that case, the driver assistance system does not require an electrical connection between the controller and/or the sensor device and the portable communication appliance, the portable communication appliance can be mounted in the interior of the vehicle, for example using a bracket, and can communicate with a sensor device which is situated outside the interior—for example mounted on the bodywork. In particular, the communication interface can send and/or receive the data on the basis of a standard from the IEEE-802.11 family (Wireless Local Area Network) and/or on the basis of a standard from the IEEE-802.15 family (Bluetooth). This embodiment makes use of the fact that portable communication appliances usually already have communication interfaces which are suitable for transmitting data on the basis of a standard from the aforementioned families. The driver is therefore able to use a current portable communication appliance.

A sensor device installed in the vehicle which has a communication interface may be a front camera which is positioned in an interior of the vehicle behind a windscreen and is designed for capturing image data pertaining to a surrounding area in front of the vehicle and for transmitting the image data to the portable communication appliance. By way of example, the camera may be positioned on the windscreen, preferably directly beneath a vehicle roof lining, by means of a bracket. By way of example, the camera is able to capture a surrounding area up to a distance of between 5 and 20 meters, particularly up to 10 meters, in front of the vehicle. The front camera is preferably an image capture device which is able to detect light in a spectral range perceptible to humans and is thus able to record images. The front camera may be designed using CMOS (complementary metal oxide semiconductor) technology, so that a high image resolution with a broad palette of shades of grey can be provided. The use of the front camera assists the driver preferably even without a portable communication appliance; however, the portable communication appliance, which communicates with the front camera, can be used to perform supplementary functions for driver assistance. Specifically, a wide variety of supplementary functions can be performed by the portable communication appliance, namely can be provided directly by the portable communication appliance and/or by virtue of the actuation of a controller in the driver assistance system. The reason is that the portable communication appliance can then process the image data from the front camera; by way of example, it is possible to display images based on the received image data on a dedicated display device. The portable communication appliance can also subject the image data from the front camera to pattern recognition so as to recognise a road sign. It is also possible for the image data from the front camera to be taken as a basis for recognising road markings and for it to be determined when the vehicle is about to or has already drive(n) over a recognised road marking. By way of example, the portable communication appliance can output a warning signal when it has been determined that the recognised road marking is about to be or has already been driven over. This embodiment also has the advantage that the portable communication appliance can use the image data from the front camera to recognise an obstacle situated in front of the vehicle and can inform the driver accordingly. On the basis of a result of processing of the image data from the front camera, the portable communication appliance can also transmit control data to a controller in the driver assistance system in order to actuate a component of the vehicle. Thus, in this embodiment, the front camera is used as a sensor device and is equipped with a communication interface which can be used to transmit the image data to a portable communication appliance for the driver.

A sensor device installed in the vehicle for the driver assistance system may be a radar appliance which is designed for capturing radar data pertaining to a surrounding area of the vehicle and for transmitting the radar data to the portable communication appliance, namely via its communication interface. In this embodiment, the driver assistance system thus has a radar appliance as a sensor device, which radar appliance is operational even without the portable communication appliance and is equipped with a communication interface. By way of example, the radar appliance may be fitted in a corner area of a rear bumper on the vehicle. There may also be two radar appliances provided which are each arranged in a corner area of the rear bumper and are able to transmit radar data to the portable communication appliance via respective communication interfaces. The radar appliance also captures a blind-spot area of the vehicle, in particular, that is to say a surrounding area of the vehicle which the driver is able to see neither in the interior mirror nor in the exterior mirror. This embodiment has various advantages: the portable communication appliance can take the received radar data as a basis for locating objects, for example, in the surrounding area of the vehicle. By way of example, the portable communication appliance can display images based on the received radar data on a dedicated display device. The portable communication appliance can recognise objects in the blind-spot area of the vehicle and can accordingly inform the driver that there is an object overtaking the vehicle in the blind-spot area. By processing the radar data, the portable communication appliance can also ascertain a speed and/or an acceleration and/or a direction of movement for a recognised object relative to the vehicle and can inform the driver about the speed and/or the acceleration and/or the direction of movement.

In one embodiment, the driver assistance system has, as the sensor device, an ultrasonic sensor which is installed in the vehicle and, in particular, is operational even without the portable communication appliance, and which is designed for capturing ultrasonic data pertaining to a surrounding area of the vehicle and for transmitting the ultrasonic data to the portable communication appliance. Thus, a sensor device may be an ultrasonic sensor which has its communication interface for transmitting ultrasonic data to the portable communication appliance of the driver. The ultrasonic data can be used by the portable communication appliance to perform a wide variety of functions which assist the driver in driving the vehicle. Specifically, the portable communication appliance can display images based on the ultrasonic data on a dedicated display device. By way of example, the portable communication appliance can display recognised obstacles on the display device. The ultrasonic sensor is preferably arranged on a lateral face of the vehicle, namely preferably in a marginal area of a front bumper or in the area of an exterior mirror. The driver assistance system may also have two ultrasonic sensors which are each fitted to a lateral face of the vehicle and transmit ultrasonic data to the portable communication appliance. A further advantage of this embodiment is that the portable communication appliance can use the ultrasonic data to assist the driver in performing parking manoeuvres. Specifically, the portable communication appliance can calculate a parking path, along which the vehicle can be parked in a parking space which has been recognised, on the basis of the ultrasonic data. By way of example, the portable communication appliance can inform the driver about which steering actions he needs to perform in order to park in the parking space which has been recognised. In addition or as an alternative, the portable appliance can also transmit control data to a controller for actuating a steering apparatus, which controller may be part of the driver assistance system and may have a communication interface. The portable communication appliance can therefore steer the steerable wheels of the vehicle, as a result of which the vehicle can be parked in the parking space along the calculated parking path.

As (a) sensor device(s), the driver assistance system may comprise at least one camera, in particular a multiplicity of cameras, which is/are arranged on an exterior surface of the vehicle and which is/are designed for capturing image data pertaining to a surrounding area of the vehicle and for transmitting the image data to the portable communication appliance. In this embodiment, the cameras are thus used to capture the surroundings around the vehicle; they may each have a capture area, the opening angle of which is approximately 180°, so that just four cameras can be used to capture the entire surroundings of the vehicle—a 360° image. Such a camera may be arranged on the front bumper of the vehicle, for example, one camera on the rear bumper of the vehicle, one camera on the left-hand lateral face and one camera on the right-hand lateral face. This embodiment ensures that the driver is informed about the entire surroundings of the vehicle, specifically including about those surrounding areas of the vehicle which he is himself able to see neither in the exterior mirror nor in the interior mirror. Specifically, the portable communication appliance is able to display images based on the received image data on a dedicated display device. By way of example, the driver then does not need to make use of a helper when performing a difficult parking manoeuvre in order to perform the parking manoeuvre successfully; this is because the portable communication appliance can inform the driver about the situation in the vehicle surroundings, namely on the basis of the image data from the cameras.

As a controller, the driver assistance system may have a braking controller installed in the vehicle. In that case, a controller installed in the vehicle is a braking controller which has a communication interface for communicating with a portable communication appliance of the driver. The braking controller may be designed to use its communication interface to receive control data directly from the portable communication appliance and to actuate a braking system in the vehicle on the basis of the control data. This embodiment has the advantage that a mobile telephone and/or a portable personal computer of the driver can intervene in the braking system of the vehicle directly, namely by transmitting the control data. By way of example, the mobile telephone and/or the portable personal computer can use image data from a front camera to determine when the vehicle is about to or has already drive(n) over a road marking, and can operate the braking system when it has been determined that the road marking is about to be or has already been driven over. By way of example, the portable communication appliance of the driver can prompt the vehicle to be decelerated by less than 0.3 G in order to warn the driver about the possibility of driving over the road marking.

A controller installed in the vehicle may be a headlamp controller which is designed to use its communication interface to receive control data directly from the portable communication appliance and to take the control data as a basis for actuating a headlamp on the vehicle. This embodiment ensures that the portable communication appliance of the driver can—for example on the basis of a result of processing image data from a front camera—actuate the headlamp on the vehicle directly, namely by transmitting control data to the headlamp controller. Therefore, the portable communication appliance of the driver can perform a function according to which the headlamp of the vehicle is actuated automatically, namely on the basis of image data from a front camera, for example.

A controller installed in the vehicle may be a steering controller which is designed to use its communication interface to receive control data directly from the portable communication appliance and to take the control data as a basis for actuating a steering apparatus in the vehicle and hence steering the steerable wheels of the vehicle. In this embodiment, the portable communication appliance of the driver can thus transmit control data to the steering controller and can therefore steer the steerable wheels of the vehicle or control the road for the vehicle. This embodiment is found to be particularly advantageous particularly when assisting the driver in performing parking manoeuvres. By way of example, the portable communication appliance can take ultrasonic data as a basis for calculating a parking path and can actuate the steering controller such that the vehicle is parked in a parking space along the calculated parking path.

The driver assistance system may comprise a screen controller. In that case, a controller installed in the vehicle is a screen controller. The screen controller may be designed to use its communication interface to receive image data directly from the portable communication appliance and to display images based on the received image data on a screen of the driver assistance system. Therefore, the portable communication appliance of the driver is also able to display images based on image data from a camera, for example, on a screen situated in the interior of the vehicle. This is particularly advantageous when a dedicated display of the portable communication appliance is small and the vehicle has an additional screen on the dashboard, for example. A further advantage of this embodiment is that the portable communication appliance of the driver may not comprise a dedicated display device, the image data can be transmitted to the screen controller installed in the vehicle, and images can be displayed on the screen of the driver assistance system.

A controller installed in the vehicle may be an image projector controller which is used to actuate an image projector which can be used to project images with information onto a windscreen of the vehicle (what is known as a head-up display). The image projector controller then comprises a communication interface which it can use to receive control data directly from the portable communication appliance. The portable communication appliance can then transmit control data to the image projector controller in order to actuate the image projector. Therefore, important information can be put directly into the field of view of the driver, such as particularly the respective current speed of the vehicle, images containing navigation advice, and also warnings—for example lane-departure warnings. All of this information can be projected onto the windscreen, which means that the driver is not distracted from the road situation.

In one embodiment, the driver assistance system comprises the portable communication appliance, which means that the portable communication appliance is part of the driver assistance system.

The portable communication appliance may be designed to receive image data pertaining to a surrounding area in front of the vehicle directly from a front camera, to process said data, and to take a result of the processing as a basis for performing a function—namely for providing it itself and/or for actuating a controller installed in the vehicle—which assists the driver in driving the vehicle. The portable communication appliance may have a display device—for example a screen or a display—and can display images based on the image data on the display device. Therefore, images pertaining to the surrounding area in front of the vehicle can be displayed to the driver. Therefore, the driver can recognise obstacles, for example, which are situated in the surrounding area in front of the vehicle. Provision may also be made for the portable communication appliance to be designed to transmit control data to a screen controller in the vehicle and thereby to actuate a screen inside the vehicle. In that case, the portable communication appliance receives image data from the front camera, processes said data, and sends control data to the screen controller, which then displays images based on the control data on the screen.

For the purpose of recognising a road sign, the portable communication appliance can subject the received image data to pattern recognition, so as to recognise a road sign. When the portable communication appliance recognises a road sign, the communication appliance can display an image reproducing the recognised road sign on a display device—whether it be on a dedicated display device or an external display device—and/or can output an audible signal which is associated with the recognised road sign or characterizes the road sign, namely using a loudspeaker installed in the portable communication appliance. Therefore, the driver can be provided with road sign recognition in his vehicle as a function, without the vehicle having been designed at the factory to provide such a function. All that is required is a front camera factory-installed in the vehicle which captures image data pertaining to the surrounding area in front of the vehicle and transmits them to the portable communication appliance.

The portable communication appliance can take received image data as a basis for recognising road markings, can determine when the vehicle is about to or has already drive(n) over a recognised road marking, and can output a warning signal, which warns the driver about when the road marking is about to be or has been driven over, when it has been determined that the recognised road marking is about to be or has already been driven over. It is thus possible to use image data from the camera factory-installed in the vehicle and to use an appropriate computer program on the portable communication appliance to provide a lane-departure alerter, which may not be present in every feature variant of a vehicle model. By way of example, the warning signal can be used to actuate a loudspeaker, so that the driver is audibly warned about the road marking being about to be or having been driven over. In addition or as an alternative, the warning signal can be used to actuate a further controller—which is installed in the vehicle—, namely a braking controller for automatically operating a braking system in the vehicle, for example. In that case, the portable communication appliance transmits data with the warning signal to the braking controller; the braking controller intervenes in the braking system and in this way warns the driver about the road marking being about to be or having been driven over.

The portable communication appliance may be designed to take the image data as a basis for recognising an obstacle, particularly a pedestrian, and, having recognised an obstacle, to output a signal which informs the driver about the recognised obstacle. This increases safety.

On the basis of the received image data pertaining to the surrounding area in front of the vehicle, the portable communication appliance can also perform further functions. By way of example, the portable communication appliance may be designed to take the image data as a basis for recognising fog and/or a level of brightness for the surroundings and/or a headlamp or light from oncoming traffic and/or a tail lamp on a vehicle in front, and to take this as a basis for performing a function which assists the driver in driving the vehicle. In particular, the portable communication appliance can take fog which has been recognised and/or can take the level of brightness in the surroundings and/or can take a headlamp which has been recognised from oncoming traffic and/or can take a tail lamp which has been recognised from a vehicle in front as a basis for transmitting control data to a headlamp controller, installed in the vehicle, in the driver assistance system and can thereby actuate a headlamp on the vehicle. The driver can therefore be provided with a light assistance system in his vehicle as a function.

The portable communication appliance may be designed to receive image data directly from a multiplicity of cameras arranged on an exterior surface of the vehicle, to process the image data from all cameras, and to take a result of the processing as a basis for performing a function which assists the driver in driving the vehicle. Therefore, the driver is informed about the situation in the entire surroundings of the vehicle, namely in particular directly by the portable communication appliance. This may be particularly useful for assisting the driver in performing parking manoeuvres, for example.

The portable communication appliance may comprise a display device and can display images based on the received image data from the camera situated outside the interior of the vehicle on the display device. By way of example, the driver may have such images displayed on the display device as correspond directly to the images recorded by at least one of the cameras, by dispensing with image processing by the portable communication appliance. The driver is therefore able to see a surrounding area of the vehicle without needing to continually turn around.

The portable communication appliance may have an acceleration sensor and/or a compass and/or a navigation system—for example with a GPS receiver and/or Galileo receiver—and can take the measured values from the acceleration sensor and/or data from the navigation system as a basis for selecting an area from an overall surrounding area which can be captured by the cameras and for displaying images pertaining to the selected area on a display device. The reason is that the portable communication appliance can take the measured values from the acceleration sensor and/or from the compass as a basis for recognising a direction in which the driver is turning or wishes to turn the vehicle, for example. From the data from a navigation system, the portable communication appliance can draw inferences as to whether the vehicle is currently situated at a junction or whether it is about to go through a junction, for example. By way of example, the portable communication appliance can display images pertaining to a surrounding area to the left of the vehicle on the display device when it is established that the driver wishes to turn right. In accordance with a further example, the portable communication appliance can display images pertaining to the surrounding area behind the vehicle when the measured values from the acceleration sensor are used to recognise that the vehicle is reversing. In this embodiment, calibration can first of all be performed before the portable communication appliance is started up, so that the orientation of the portable communication appliance in the vehicle is taken into account. In addition or as an alternative, this function can be enabled only when the portable communication appliance is mounted on a bracket—for example on the windscreen of the vehicle. The reason is that this ensures that the orientation of the portable communication appliance in the vehicle is prescribed and therefore known. Provision may also be made—if the portable communication appliance comprise an acceleration sensor—for the portable communication appliance itself to be able to determine its orientation in space on the basis of measured values from the acceleration sensor and therefore to be able to calibrate itself.

In one embodiment, the portable communication appliance is designed to process the image data from the cameras in order to calculate image data which contain a presentation of a plan view of at least one area from an overall surrounding area which can be captured by the cameras. In this case, the portable communication appliance can calculate image data which contain a presentation of a plan view of the vehicle and an area of the vehicle surroundings. A surrounding area of the vehicle, particularly a surrounding area of the vehicle which the driver is unable to see, can thus be displayed to the driver on the display device of the portable communication appliance from a birds-eye view. Such a plan view of the vehicle and its surrounding area is particularly user friendly, and the driver is therefore able to infer the distances between the vehicle and any objects situated in the surrounding area, or to recognise to a critical situation, with particular ease. When performing parking manoeuvres, for example, such a birds-eye view may be useful; this is because the driver can recognise the orientation of the vehicle relative to objects situated beside the vehicle from the presentation of the plan view and can thus reliably complete a parking manoeuvre.

The portable communication appliance may be designed to alternately display images from the multiplicity of cameras. In that case, the driver is alternately provided with a display of images from different surrounding areas of the vehicle, and he is able to obtain more information about the overall surroundings of the vehicle without the portable communication appliance having to perform complex processing of the image data.

The portable communication appliance may be designed to receive radar data pertaining to a surrounding area of the vehicle directly from a radar appliance, to process said data, and to take a result of the processing as a basis for performing a function which assists the driver in driving the vehicle. By way of example, the portable communication appliance can use its display device to display images which are based on the received radar data. The portable communication appliance can use its display device to highlight obstacles and/or to inform the driver about obstacles which have been recognised using audible signals.

In one embodiment, the portable communication appliance can receive ultrasonic data pertaining to a surrounding area of the vehicle directly from an ultrasonic sensor installed in the vehicle, can process said data, and can take a result of the processing as a basis for performing a function which assists the driver in driving the vehicle. In this embodiment too, the driver communication appliance can display images based on the ultrasonic data on its display device. The portable communication appliance may also be designed to detect parking spaces using the ultrasonic data and to assist the driver in parking the vehicle in a parking space which has been recognised. Specifically, the portable communication appliance can calculate a parking path which the vehicle needs to take in order to arrive at a final position in a parking space which has been recognised. The portable communication appliance can also transmit control data to a steering controller installed in the vehicle in order to steer the steerable wheels of the vehicle. Therefore, the driver can be provided with a semiautonomous parking aid system in which the driver merely needs to accelerate and brake in order to park the vehicle in a parking space. The steering of the steerable wheels of the vehicle can be undertaken by the portable communication appliance.

The portable communication appliance may be designed to combine radar data received from a radar appliance and ultrasonic data received from an ultrasonic sensor and/or the radar data and image data received from a camera and/or the ultrasonic data and the image data with one another. Therefore, the portable communication appliance can perform a plausibility check on the radar data and/or on the ultrasonic data and/or on the image data. It therefore becomes possible to provide the functions based on the radar data and/or on the ultrasonic data and/or on the image data reliably and with the greatest precision. For a plausibility check, the portable communication appliance can also use measured values from a dedicated acceleration sensor and/or data from a dedicated navigation system.

In one embodiment, the portable communication appliance comprises an acceleration sensor and/or a compass and/or a navigation system—for example with a GPS receiver and/or Galileo receiver. The portable communication appliance can then take measured values from the acceleration sensor and/or from the compass and/or data from the navigation system as a basis for performing a function which assists the driver in driving the vehicle.

The portable communication appliance may thus comprise an acceleration sensor which is designed for measuring an acceleration by the portable communication appliance. The portable communication appliance may be designed to take the measured values for the acceleration as a basis for performing a function which assists the driver in driving the vehicle. The function can be provided by the portable communication appliance itself and/or can be actuated by a controller in the vehicle, which then provides the function. Thus, in one embodiment, measured values from an acceleration sensor installed in the portable communication appliance are used to assist the driver in driving the vehicle. This embodiment makes use of the fact that some portable communication appliances available on the market—for example mobile telephones—already have an installed acceleration sensor. It is based on the insight that the measured values from the acceleration sensor can be taken as a basis for performing a function which assists the driver in driving his vehicle. This embodiment has the advantage that information about the acceleration of the vehicle and information about a driving state of the vehicle, which can be ascertained from the acceleration, do not need to be tapped off from a communication bus in the vehicle, not to mention the portable communication appliance communicating with the controllers and/or sensor devices and not with a communication bus in the vehicle. The portable communication appliance uses the measured values from its own acceleration sensor and can take the measured values as a basis for assisting the driver in driving the vehicle. By way of example, this allows a wide variety of driving states to be ascertained for the vehicle. Specifically, this allows it to be determined whether the driver is driving his vehicle through a left-hand bend or else a right-hand bend, for example. As a further example, mention may be made here of the option of using the measured values from the acceleration sensor to determine a course for a road covered by the vehicle.

The acceleration sensor is preferably a three-dimensional acceleration sensor. This means that the acceleration sensor can be used to measure the acceleration of the portable communication appliance in all three directions of a Cartesian coordinate system. Therefore, the distribution of the forces of acceleration in the coordinate system is known. The portable communication appliance can therefore preferably capture not only an acceleration by the vehicle forwards or a deceleration by the vehicle but also a transverse acceleration and/or an acceleration in a vertical direction.

The portable communication appliance can take the measured values from the acceleration sensor as a basis for performing a wide variety of functions which assist the driver in driving the vehicle. By way of example, it can take the measured values from the acceleration sensor as a basis for determining a driving behaviour for the driver and can inform the driver about his driving behaviour. By way of example, this may take the appearance of the portable communication appliance storing a multiplicity of predetermined value ranges and the portable communication appliance checking which of the predetermined value ranges contains the respective current measured values from the acceleration sensor. Each value range may then be associated with a particular driving behaviour of the driver; by way of example, relatively small measured values from the acceleration sensor may be associated with an "economical" driving behaviour, whereas average measured values can be associated with a "normal" driving behaviour and relatively high measured values can be associated with a "sporty" driving behaviour. The driver can be informed about his driving behaviour by the portable communication appliance, and he is able to adjust or alter his driving behaviour. In doing this, he can take account of fuel consumption, for example, which is usually dependent on the driving behaviour of a driver.

In principle, the portable communication appliance is able to inform the driver about his driving behaviour in different ways. By way of example, the portable communication appliance can inform the driver about his driving behaviour audibly, namely by outputting appropriate audible signals which characterize the driving behaviour of the driver. It has been found to be particularly advantageous if the portable communication appliance takes the driving behaviour of the driver as a basis for altering the colouring of lighting, particularly of background lighting, for a display device of the portable communication appliance. In this context, the "economical" driving behaviour may have associated green lighting, whereas the "normal" driving behaviour may have associated blue lighting and the "sporty" driving behaviour may have associated red lighting on the display device. Hence, the driver is able to recognise directly from the colouring of the display device what his current driving behaviour is like or whether or not his current driving behaviour is correct.

When determining the driving behaviour, the portable communication appliance can evaluate the measured acceleration over a predetermined period too and can take this evaluation as a basis for informing the driver about his driving behaviour as appropriate. By way of example, the acceleration can be averaged over a predetermined period. In that case, the portable communication appliance can check which value range contains the averaged acceleration. The effect achieved by this is that the colouring of the lighting does not constantly need to be altered and/or the driver does not need to be informed too often about a frequent change in his driving behaviour in another manner.

A function for driver assistance which can be performed by the portable communication appliance on the basis of the measured values from the acceleration sensor may be accident identification. The communication appliance can set up a communication link between the portable communication appliance and an emergency control centre when a predetermined emergency criterion based on the measured values from the acceleration sensor is met. The predetermined emergency criterion may in this case involve at least one measured value from the acceleration sensor exceeding a predetermined limit value and/or the measured acceleration undergoing a predetermined change or having a predetermined characteristic. The reason is that if the absolute value of a measured value from the acceleration sensor exceeds a limit value and/or if the acceleration undergoes a predetermined change then this may be an indication that an accident is taking place or is impending. By way of example, the predetermined change or the characteristic of the acceleration may comprise a sudden change—in that case, the emergency criterion is that the absolute value of a measured value for the acceleration is very large or exceeds a limit value, and a subsequent measured value for the acceleration is very small, in particular is zero. In addition or as an alternative, the emergency criterion may involve the portable communication appliance and hence also the vehicle no longer moving when the acceleration has undergone a predetermined change—particularly an abrupt change. Such information can be obtained from measured values from the acceleration sensor and/or from data from a navigation system, for example. In addition or as an alternative, the predetermined emergency criterion may involve the portable communication appliance having a predetermined orientation in space—which can be ascertained from the measured values from the acceleration sensor. The setup of the communication link between the portable communication appliance and an emergency control centre provides the driver with the opportunity to inform someone about the accident very quickly. In addition or as an alternative, the portable communication appliance can transmit data to the emergency control centre, so that the emergency control centre is informed about the accident more or less automatically by the portable communication appliance.

A function which can be performed by the portable communication appliance on the basis of the measured values from the acceleration sensor may be load identification for the vehicle. In this embodiment, the portable communication appliance can take the measured values from the acceleration sensor as a basis for determining a load for the vehicle and/or a distribution for the load in the vehicle and can inform the driver about the load and/or about the distribution of the load. When determining the load and/or the distribution of the load in the vehicle, the portable communication appliance can—if it communicates with appropriate sensor devices and/or controllers directly—also take account of further vehicle-specific information, namely particularly a steering angle and/or a spring deflection by a shock absorber in the vehicle. The reason is that the behaviour of the vehicle during cornering and/or a distribution of the forces of acceleration—particularly an acceleration in a vertical direction—can be taken as a basis for determining the load of the vehicle and/or the distribution of the load in the vehicle. The portable communication appliance can determine the load and/or the distribution of the load in the vehicle by taking account of measured values for the acceleration when the vehicle is unladen. Such measured values, and also possibly the weight of an unladen vehicle, may be stored in the portable communication appliance, namely in a memory. This embodiment has the advantage that the driver can adjust his driving behaviour to suit the respective current load and/or distribution of the load in the vehicle. The portable communication appliance can also inform the driver about how the current load and/or the current distribution of the load in the vehicle influences the performance of different driving manoeuvres. By way of example, the portable communication appliance can output a warning signal when the load is distributed or positioned unfavourably in the vehicle and the performance of a particular driving manoeuvre might present a hazard.

The measured values from the acceleration sensor can be taken as a basis for the portable communication appliance to determine a level of concentration for the driver. The portable communication appliance can inform the driver about the level of concentration and/or can warn the driver when his level of concentration drops below a predetermined level or when the attention of the driver diminishes. Thus, in this embodiment, the portable communication appliance determines the level of attention of the driver on the basis of the measured acceleration. By way of example, this may take on the appearance that the portable communication appliance takes the measured values from the acceleration sensor as a basis for ascertaining a course for a road covered by the vehicle and takes this course as a basis for determining the level of concentration. Equally, the portable communication appliance can in this way perform an alcohol test and warn the driver when an unusual driving behaviour by the driver is determined on the basis of the measured values from the acceleration sensor. If the concentration of the driver diminishes or an unusual driving behaviour by the driver is determined, the portable communication appliance can set up a communication link to an emergency control centre and transmit data to the emergency control centre. In that case, the emergency control centre is informed about a potential hazard on the road.

A function which can be performed by the portable communication appliance on the basis of the measured values from the acceleration sensor may be speed measurement. Specifically, the portable communication appliance can take the measured values from the acceleration sensor as a basis for determining a speed for the portable communication appliance and hence for the vehicle. This embodiment is found to be particularly advantageous particularly in the case of transits through tunnels. The reason is that in that case there are no navigation data available from a navigation system which may be present in the portable communication appliance. In this embodiment, the navigation system of the portable communication appliance can use the speed values ascertained on the basis of the measured values from the acceleration sensor and can provide the driver with uninterrupted navigation advice.

A function which can be performed by the portable communication appliance using the measured values from the acceleration sensor may be recognition of an imminent parking manoeuvre by the vehicle. In that case, the portable communication appliance can take the measured values from the acceleration sensor as a basis for recognising an imminent parking manoeuvre by the vehicle and, when an imminent parking manoeuvre has been recognised, can assist the driver in performing the parking manoeuvre. By way of example, the portable communication appliance can, in this embodiment, receive ultrasonic data from an ultrasonic sensor and/or image data from a camera and/or radar data from a radar appliance directly and can assist the driver in performing the parking manoeuvre on the basis of processing of the ultrasonic data and/or of the image data and/or of the radar data. The portable communication appliance can take the ultrasonic data and/or the image data and/or the radar data as a basis for calculating a parking path along which the vehicle can be parked in a parking space. In that case, the portable communication appliance can send control data directly to a steering controller and hence can steer the steerable wheels of the vehicle in accordance with the calculated parking path. In addition or as an alternative, the portable communication appliance can also display images based on the received ultrasonic data and/or on the image data and/or on the radar data on a display device of the portable communication appliance. By way of example, the portable communication appliance can use the display device to display images pertaining to the surroundings of the vehicle. The same can also be displayed by the portable communication appliance on a display device inside the vehicle, namely by outputting appropriate control data to a controller. The portable communication appliance can use the measured values from the acceleration sensor to recognise a direction of travel for the vehicle and can take the recognised direction of travel as a basis for extrapolating a road along which the vehicle is most probably being driven. The portable communication appliance can then use its display device and/or a display device inside the vehicle to display the extrapolated road, and also images pertaining to the surroundings of the vehicle.

Preferably, the portable communication appliance comprises a navigation system, particularly with a GPS (Global Positioning System) receiver and/or a Galileo receiver. In that case, the portable communication appliance can also perform a function which assists the driver in driving the vehicle by taking account of data from the navigation system. By way of example, the portable communication appliance can warn the driver when it recognises that a lane is about to be or has already been left on the basis of the data from the navigation system and/or the measured values from the acceleration sensor. The use of data from the navigation system for driver assistance further extends the functionality of the portable communication appliance.

In one embodiment, the functionality of the portable communication appliance is extended by a compass. The reason is that the portable communication appliance may comprise a compass and can also perform a function which assists the driver in driving the vehicle by taking account of measured values from the compass. This is because measured values from a compass can be used to recognise the change in the direction of travel of the vehicle; it is also possible to ascertain a course for a road covered by the vehicle. The measured values from the compass can be used by the portable communication appliance to perform a plausibility check on a variable which has already been ascertained on the basis of the measured values from the acceleration sensor—for example a driving behaviour by the driver. By way of example, the portable communication appliance can check whether a driving behaviour by the driver which has been ascertained using the measured values from the acceleration sensor matches a driving behaviour which has been ascertained using the measured values from the compass.

A function which can be performed by the portable communication appliance using the measured values from the acceleration sensor may be recognition of a condition of a road. Specifically, the portable communication appliance can take the measured values from the acceleration sensor as a basis for inferring a condition of a road on which the vehicle is being driven. In particular, the portable communication appliance can take measured values from the acceleration sensor as a basis for ascertaining a coefficient of friction which then characterizes the condition of the road. The portable communication appliance can inform the driver about the condition of the road. By way of example, this make take on the appearance that a multiplicity of predetermined possible conditions are stored in the portable communication appliance, namely "Ice" and/or "Snow" and/or "Sand" and/or "Rain" and/or "Good road condition", for example. When ascertaining the condition of the road, the portable communication appliance can also take account of further vehicle-specific information, which the portable communication appliance can receive directly from controllers in the vehicle. Specifically, the portable communication appliance can receive a piece of information about an engine speed from an engine controller and/or about a pedal travel by an accelerator pedal from a pedal travel sensor and can use it to determine the condition of the road. In one implementation of this embodiment, the portable communication appliance can take the received information and calculate a target value for the acceleration of the vehicle and compare the measured values from the acceleration sensor with the calculated target value. On the basis of a result of the comparison, the portable communication appliance can then infer the condition of the road. In this embodiment, the driver can thus be informed about the actual conditions on the road, and he can adjust his driving behaviour to suit the prevailing conditions on the road. It is also a useful possibility that the portable communication appliance is able to send data with information about the condition of the road via its communication interface to appliances in other vehicles and/or to an external data processing apparatus—in this case preferably in a manner complied with mobile radio—and/or to an emergency control centre.

The portable communication appliance may also be designed to transmit data received from a sensor device to a data processing apparatus outside the vehicle. Hence, a sensor device installed in the vehicle can transmit captured sensor data to an external centre for the purpose of diagnosis. The external data processing apparatus can then use the sensor data to check the operability of the sensor device installed in the vehicle. The data can be transmitted to the external data processing apparatus in a manner complied with mobile radio, for example, that is to say on the basis of a mobile radio standard (for example GSM and/or UMTS).

The invention also includes a vehicle having a driver assistance system according to the invention or having a preferred refinement thereof.

A method according to the invention involves a driver being assisted in driving a vehicle using a driver assistance system. The driver assistance system comprises at least one controller installed in the vehicle and/or at least one sensor device installed in the vehicle. By bypassing a data transmission system inside the vehicle, data are transmitted via a communication interface in the controller and/or in the sensor device directly between the controller and/or the sensor device and a portable communication appliance at least in one direction. The data transmission causes the portable communication appliance and the controller and/or the sensor device to interact such that at least one function is performed which assists the driver in driving the vehicle.

Further features of the invention can be found in the claims, in the FIGURE and in the description of the FIGURES. All of the features and feature combinations cited in the description above and also the features and feature combinations cited in the description of the FIGURES below or shown in the FIGURE on its own can be used not only in the respectively indicated combination but also in other combinations or else on their own.

The invention will now be explained in more detail using a preferred exemplary embodiment, and also with reference to the appended drawing. The single FIGURE shows a schematic illustration of a vehicle having a driver assistance system based on an embodiment of the invention.

A car 1, which is shown in a schematic illustration in the FIGURE, comprises a driving assistance system, factory-installed in the car 1, for assisting a driver in driving the car 1.

The driver assistance system comprises a steering controller 2 for actuating a steering apparatus 3 in the car 1. The steering controller 2 can therefore steer the steerable wheels of the car 1, namely by virtue of appropriate operation of the steering apparatus 3.

Furthermore, the driver assistance system comprises a braking controller 4 for actuating a braking system 5 in the car 1. By outputting appropriate control signals to the braking system 5, the braking controller 4 can brake the car 1.

Furthermore, the driver assistance system comprises a wiper and/or rinser or washer system controller 6 which is used to actuate a wiper and/or washer system 7 for a windscreen 8 on the car 1. By outputting appropriate control signals to the wiper and/or washer system 7, the wiper system and/or washer system controller 6 can initiate a washing operation on the windscreen 8.

The driver assistance system comprises an image projector controller 9 which is designed for actuating an image projector 10 (Head-up display). The image projector 10 can be used to project images onto the windscreen 8. By way of example, the image projector 10 may be arranged on a dashboard in the car 1.

The driver assistance system comprises a headlamp controller 11 which is used to actuate headlamps 12, 13 on the car 1. By outputting appropriate control signals, the headlamp controller 11 can switch between a dipped beam and a full beam, for example, and/or can activate and deactivate a fog light and/or—if the design of the headlamps 12, 13 so allows—can set a bright/dark limit for the full beam and/or for the dipped beam as desired.

The driver assistance system may also have a screen controller 14 which can be used to actuate a screen 15 permanently installed in the car 1.

The driver assistance system also comprises a multiplicity of sensor devices for capturing data pertaining to vehicle surroundings:

The driver assistance system comprises a front camera 16 for capturing image data pertaining to a surrounding area in front of the car 1. The front camera 16 is positioned behind the windscreen 8 in the interior of the car 1, namely directly beneath the vehicle roof lining, for example. In the exemplary embodiment, the front camera 16 captures an area up to 10 m in front of the car 1. The front camera 16 may be a CMOS camera.

Furthermore, the driver assistance system comprises a multiplicity of cameras 17 mounted on the bodywork of the car 1, which are each used to capture a surrounding area of the car 1. In this arrangement, the cameras 17 each have a relatively wide capture area with an opening angle of 180°, for example. Therefore, the cameras 17 are able to capture overall surroundings of the car 1, namely a 360° image. The number and arrangement of the cameras 17 are shown only by way of example in the FIGURE; instead of six cameras 17, it is also possible to use four cameras 17 which, on the basis of their wide capture areas, are able to capture the overall surroundings of the car 1. The cameras 17 may be mounted on the bodywork of the car 1, namely on respective bumpers on the car 1, for example. A camera 17 is arranged on a vehicle front, a camera 17 may be arranged at a left-hand margin of the front bumper, a camera 17 may be arranged at a right-hand margin of the front bumper, a camera 17 may be arranged at a left-hand margin of a rear bumper, a camera 17 may be arranged at a right-hand margin of the rear bumper, and a camera 17 may be arranged at the back of the car 1 on the rear bumper.

The driver assistance system comprises two radar appliances 18 which are used to locate objects in the surroundings of the car 1. By way of example, the radar appliances 18 may be fitted in respective corner areas of the rear bumper of the car 1. The radar appliances 18 can also capture the respective blind-spot areas of the car 1.

Furthermore, the driver assistance system comprises two ultrasonic sensors 19, each of which is fitted on a lateral face of the car 1, namely in the area of the respective exterior mirror or in respective marginal areas of the front bumper, for example. The ultrasonic sensors 19 each capture a lateral surrounding area of the car 1.

The controllers in the driver assistance system, namely the steering controller 2, the braking controller 4, the wiper and/or washer system controller 6, the image projector controller 9, the headlamp controller 11 and the screen controller 14—, and the sensor devices in the driver assistance system—namely the front camera 16, the cameras 17, the radar appliances 18 and the ultrasonic sensors 19—, are present in the car 1 at the factory. This means that the car 1 has been delivered with such a driver assistance system; the controllers 2, 4, 6, 9, 11, 14, and also the sensor devices 16, 17, 18, 19, are therefore permanently installed in the cars 1. They are operational and are able to provide functions which assist the driver in driving the car 1 on their own or in collaboration with respective other components of the driver assistance system. By way of example, the controllers 2, 4, 6, 9, 11, 14, and also the sensor devices 16, 17, 18, 19, may be connected to at least one communication bus 20 in the car 1 and can communicate with one another via the communication bus 20—which is a data transmission system inside the vehicle. By virtue of this communication, the driver assistance system provides functions which assist the driver in driving the car 1. These functions may be the following functions, for example:

- The screen controller 14 can display images on the screen 15 which are based on image data from the cameras 17 and/or from the front camera 16 which have been tapped off from the communication bus 20;
- The front camera 16 or a controller coupled thereto can process the recorded image data and can recognise obstacles and/or road markings and/or road signs, for example;
- The radar appliances 18 can locate objects situated in the surroundings of the car 1;
- The ultrasonic sensors 19 or a controller connected thereto can recognise parking spaces and can assist the driver in performing parking manoeuvres.

All of these functions of the driver assistance system are just examples and are not intended to be conclusive. It merely needs to be stressed that the driver assistance system, as installed in the car 1, is fully operational, even without a portable communication appliance—which is described below.

In one exemplary embodiment, the controllers 2, 4, 6, 9, 11, 14 may form a joint controller or may be integrated in a joint housing. In that case, it may be sufficient to provide only one communication interface 21 for the joint controller.

The controllers 2, 4, 6, 9, 11, 14, and also the sensor devices 16, 17, 18, 19, all each have a communication interface 21 which is used for wireless data communication with a portable communication appliance 22. The controllers 2, 4, 6, 9, 11, 14, and also the sensor devices 16, 17, 18, 19, can use the respective communication interfaces 21 to send data to the portable communication appliance 22 and to receive data from the portable communication appliance 22. The communication interfaces are designed for sending and receiving data on the basis of a communication standard from the IEEE-802.11 family and/or a communication standard from the IEEE-802.15 family. The controllers 2, 4, 6, 9, 11, 14, and also the sensor devices 16, 17, 18, 19, can already be equipped with the respective communication interfaces 21 at the factory or can be upgraded at a later time.

In the exemplary embodiment, the portable communication appliance 22 is a mobile telephone. The portable communication appliance 22 may also be part of the driver assistance system, but it may also be a personal mobile telephone of the driver. The portable communication appliance comprises a communication interface 23 which is designed for communicating with the communication interfaces 21, namely on the basis of a communication standard from the aforementioned families. The portable communication appliance 22 comprises a computation device 24 for processing data, and also a display 25.

The portable communication appliance 22 can be held on the windscreen 8 of the car 1 by means of a bracket 26.

Such equipment of the controllers 2, 4, 6, 9, 11, 14, and also of the sensor devices 16, 17, 18, 19, with the respective communication interfaces 21 allows the portable communication appliance 22 to communicate with same controllers 2, 4, 6, 9, 11, 14 and sensor devices 16, 17, 18, 19. Specifically, the driver can install and execute a computer program on the portable communication appliance 22, which means that, besides the functions which are already present in the driver assistant, it is possible to provide additional functions which assist the driver in driving the car 1.

The front camera 16 transmits image data to the portable communication appliance 22. The computation device 24 can take the image data from the front camera 16 as a basis for providing the following supplementary functions for assisting the driver. The computation device 24 can use the display 25 of the portable communication appliance 22 to directly display images which are based on the image data obtained from the front camera 16. The computation device 24 can also use the communication interface 23 to transmit control data to the screen controller 14, so that images based on the image data from the front camera 16 can be displayed on the screen 15. The computation device 24 can also subject the image data from the front camera 16 to pattern recognition in order to recognise a road sign. When a road sign has been recognised, the computation device 24 can display an image reproducing the road sign which has been recognised on the display 25 and/or on the screen 15 and/or can output an audible signal which characterizes the road sign which has been recognised. On the basis of the image data from the front camera 16, the computation device 24 can recognise road markings. The computation device 24 can then determine when the car 1 is about to or has already drive(n) over a road marking which has been recognised, and, when it has been determined that the road marking is about to be or has been driven over, can output an audible signal and/or can transmit control data to the braking controller 4, as a result of which the car 1 is decelerated with a deceleration of less than 0.3 G. In that case, the driver is warned about the possibility of driving over the road marking by the braking of the car 1. In order to determine when a road marking which has been recognised is about to be or has been driven over, the computation device 24 can also take account of navigation data from a navigation system in the portable communication appliance 22 and/or measured values from an acceleration sensor integrated in the portable communication appliance 22.

The computation device 24 can take the image data from the front camera 16 as a basis for recognising fog and/or ascertaining a level of brightness for the surroundings of the car 1 and/or recognising headlamps from oncoming traffic and/or tail lamps from vehicles in front. On the basis of this, the computation device 24 can transmit control data to the headlamp controller 11 in order to actuate the headlamps 12, 13. It is also a useful option to take measured values from an acceleration sensor in the portable communication appliance 22 and particularly to take a transverse acceleration by the car 1, which is ascertained from said measured values, as a basis for actuating the headlamps 12, 13. This means that during cornering the direction of illumination can be altered in the direction of the bend, so that driving safety during cornering can be enhanced by virtue of an improved field of view.

The computation device 24 can also process the image data captured by the exterior cameras 17. By way of example, the computation device 24 can use the display 25 of the portable communication appliance 22 and/or can use the screen 15 to directly display images which are based on the image data from the cameras 17. The computation device 24 can also process the image data from the cameras 17 in order to calculate image data which contain a presentation of a plan view of the car 1 and a surrounding area thereof. In that case, the display 25 and/or the screen 15 can be used to display the car 1 from a bird's-eye view.

The computation device 24 can also combine the data received from at least two sensor devices 16, 17, 18, 19, for example by at least two cameras 17. This achieves sensor fusion or sensor union, and the computation device 24 can take the combination of the data as a basis for performing a joint sensor function which assists the driver in driving the vehicle. By way of example, this may take on the appearance that the computation device 24 combines radar data from one of the radar appliances 18 with the ultrasonic data and/or with the camera data and takes this combination as a basis for performing a joint function. By way of example, the computation device can take the combination of the respective data as a basis for recognising obstacles in the surroundings of the car 1 and can communicate this to the driver.

The computation device 25 can also transmit control data to the image projector controller 9 in order to actuate the image projector 10. By way of example, navigation advice can be transmitted to the image projector controller 9 and can then be projected onto the windscreen 8.

The computation device 25 also receives ultrasonic data from the ultrasonic sensors 19. By way of example, the computation device 24 can use the ultrasonic data to recognise parking spaces in which the car 1 can be parked. On the basis of parking spaces which have been recognised, the computation device 24 can calculate a parking path along which the car 1 can be parked in a parking space which has been recognised. The computation device 24 can also transmit control data to the steering controller 2 and can therefore steer the steerable wheels of the car 1. In this way, the driver is provided with a semiautonomous parking aid system which can be used to park the car 1 in a parking space without the driving having to perform steering actions. Specifically, the driver merely needs to accelerate and brake; the steering of the steerable wheels is undertaken by the computation device 28, namely by means of the steering controller 2. Alternatively, the computation device 20 can—instead of transmitting the control data to the steering controller 2—transmit control data to the image projector controller 9 and/or the screen controller 14 and thereby inform the driver about which steering actions he needs to perform. In that case, the driver himself can use the steering wheel to steer the steerable wheels of the car 1 and to park the car 1 in the parking space. The image projector 10 and/or the screen 15 can project or display steering advice in this case.

On the basis of fog which has been recognised and/or on the basis of soiling which has been recognised on the windscreen 8, the computation device 24 can also transmit control data to the wiper and/or washer system controller 6 and thereby activate the wiper and/or washer system 7.

The computation device 24 also receives radar data from the radar appliances 18. Specifically, the computation device 24 can take the radar data as a basis for locating objects in the respective capture areas of the radar appliances 18. By way of example, the computation device 24 can in this case determine a speed and/or an acceleration and/or a direction of movement for a recognised object relative to the car 1 and can inform the driver accordingly. By way of example, the computation device 24 can display images on the display 25 and/or the screen 15 and/or can use the image projector 10 to protect them onto the windscreen 8 and therefore inform the driver about recognised objects in the surrounding areas of the radar appliances 18. In addition or as an alternative, the computation device 24 can output audible signals which can be used to inform the driver about the recognised objects. This is particularly advantageous if the radar appliances 18 are also able to capture the blind-spot areas and to detect objects situated in the blind-spot areas.

The invention is not limited to the exemplary embodiments shown in the drawing. All the features and feature combinations described in the general part of the description above and shown in the drawing can be combined with one another, so that in this regard it is also possible for embodiments formed in this manner to be regarded as disclosed. In particular, the features and the feature combinations cited in the general part of the description can be used to generate new exemplary embodiments, namely also those which are not shown explicitly in the drawing. Features and feature combinations from the exemplary embodiments disclosed with the description of the FIGURES can be combined with features and feature combinations which are disclosed in the general part of the description to form new exemplary embodiments which can be regarded as disclosed.

The invention claimed is:

1. A driver assistance system for a vehicle, comprising:
at least one controller installed in the vehicle;
at least one sensor device installed in the vehicle; and
a portable communication appliance,
wherein the at least one controller, at least one sensor device, and the portable communication appliance are configured to communicate via a first communication interface of a data transmission system inside the vehicle,
wherein the at least one controller and/or the at least one sensor device has a second communication interface for transmitting data directly between the controller and/or the sensor device and a portable communication appliance at least in one direction by bypassing the first communication interface of the data transmission system,
wherein a data transmission via the second communication interface causes the portable communication appliance and the controller and/or the sensor device to interact to perform at least one function which assists a driver in driving the vehicle.

2. The driver assistance system according to claim 1, wherein the at least one controller and/or the at least one sensor device is connected to the data transmission system,
wherein the at least one controller and/or the at least one sensor device provides a function for driver assistance on a basis of a second data transmission via the first communication interface of the data transmission system inside the vehicle, as a result of which an additional function is performed by virtue of the interaction of the portable communication appliance and the controller and/or the sensor device.

3. The driver assistance system according to claim 1, wherein the second communication interface transmits data directly between the controller and/or the sensor device and a portable communication appliance comprising one selected from a group consisting of a mobile telephone or a portable personal computer.

4. The driver assistance system according to claim 1, wherein the second communication interface is designed for wireless data transmission.

5. The driver assistance system according to claim 4, wherein the second communication interface is designed to send and receive the data on the basis of a standard from the IEEE-802.11 family and/or a standard from the IEEE-802.15 family.

6. The driver assistance system according to claim 1, wherein the sensor device installed in the vehicle is a front camera positioned in an interior of the vehicle behind a windscreen, wherein the front camera is for capturing image data pertaining to a surrounding area in front of the vehicle and for transmitting the image data to the portable communication appliance.

7. The driver assistance system according to claim 1, wherein the sensor device installed in the vehicle is a radar appliance for capturing radar data pertaining to a surrounding area of the vehicle and for transmitting the radar data to the portable communication appliance.

8. The driver assistance system according to claim 1, wherein the sensor device installed in the vehicle is an ultrasonic sensor for capturing ultrasonic data pertaining to a surrounding area of the vehicle and for transmitting the ultrasonic data to the portable communication appliance.

9. The driver assistance system according to claim 1, wherein the sensor device installed in the vehicle comprises a plurality of cameras arranged on an exterior surface of the vehicle for capturing image data pertaining to a surrounding area of the vehicle and for transmitting the image data to the portable communication appliance.

10. The driver assistance system according to claim 1, wherein the controller installed in the vehicle is a braking controller, wherein the braking controller communicates by the second communication interface and is used to receive control data directly from the portable communication appliance and to take the control data as a basis for actuating a braking system in the vehicle.

11. The driver assistance system according to claim 1, wherein the controller installed in the vehicle is a headlamp controller, wherein the headlamp controller communicates by the second communication interface and is used to receive control data directly from the portable communication appliance and to take the control data as a basis for actuating a headlamp on the vehicle.

12. The driver assistance system according to claim 1, wherein the controller installed in the vehicle is a steering controller, wherein the steering controller communicates by the second communication interface and is used to receive control data directly from the portable communication appliance and to take the control data as a basis for actuating a steering apparatus in the vehicle.

13. The driver assistance system according to claim 1, wherein the controller installed in the vehicle is a screen controller, wherein the screen controller communicates by the second communication interface and is used to receive image data directly from the portable communication appliance and to display images based on the received image data on a screen of the driver assistance system.

14. The driver assistance system according to claim 1, wherein the portable communication appliance receives image data pertaining to a surrounding area in front of the vehicle directly from a front camera and processes said data to take a result of the processing as a basis for performing a function which assists the driver in driving the vehicle.

15. The driver assistance system according to claim 14, wherein the portable communication appliance has a display device configured to display images based on the received image data.

16. The driver assistance system according to claim 14, wherein the portable communication appliance recognizes a road sign by subjecting the image data to pattern recognition.

17. The driver assistance system according to claim 14, wherein the portable communication appliance takes the image data from the front camera as a basis for recognizing road markings, to determine when the vehicle is about to or has already driven over a recognized road marking, and to output a warning signal which warns the driver about the recognized road marking when the road marking is about to be driven over.

18. The driver assistance system according to claim 14, wherein the portable communication appliance takes the image data as a basis for recognizing an obstacle, and to output a signal which informs the driver about the recognized obstacle.

19. The driver assistance system according to claim 14, wherein the portable communication appliance takes a result of the processing of the image data from the front camera as a basis for sending control data to a headlamp controller for actuating a headlamp on the vehicle.

20. The driver assistance system according to claim 14, wherein the portable communication appliance receives image data directly from a plurality of cameras arranged on an exterior surface of the vehicle, processes the image data from all cameras, and obtains a result of the processing as a basis for performing a function which assists the driver in driving the vehicle.

21. The driver assistance system according to claim 20, wherein the portable communication appliance has a display device for displaying images based on the received image data from the cameras on the display device.

22. The driver assistance system according to claim 20, wherein the portable communication appliance comprises an acceleration sensor and/or a navigation system and is configured to obtain measured values from the acceleration sensor and/or data from the navigation system as a basis for selecting an area from an overall surrounding area captured by the plurality of cameras and to display images on the display device pertaining to the selected area.

23. The driver assistance system according to claim 20, wherein the portable communication appliance processes the image data from the plurality of cameras to calculate such image data as containing a presentation of a plan view of at least one area from an overall surrounding area captured by the plurality of cameras.

24. The driver assistance system according to claim 1, wherein the portable communication appliance receives radar data pertaining to a surrounding area of the vehicle directly from a radar appliance, processes said data, and obtains a result of the processing as a basis for performing a function which assists the driver in driving the vehicle.

25. The driver assistance system according to claim 1, wherein the portable communication appliance receives ultrasonic data pertaining to a surrounding area of the vehicle directly from an ultrasonic sensor, processes said data, and obtains a result of the processing as a basis for performing a function which assists the driver in driving the vehicle.

26. The driver assistance system according to claim 1, wherein the portable communication appliance comprises one selected from a group consisting of an acceleration sensor, a navigation system, and a compass, and is configured to take measured values from the acceleration sensor, data from the navigation system, or measured values from the compass as a basis for performing a function which assists the driver in driving the vehicle.

27. The driver assistance system according to claim 1, wherein the portable communication appliance transmits data received from a sensor device to a data processing apparatus outside the vehicle.

28. A vehicle comprising a driver assistance system according to claim 1.

29. A method for assisting a driver in driving a vehicle using a driver assistance system which has at least one controller and at least one sensor device installed in the vehicle, the method comprising:
 transmitting data using a second communication interface of the controller and/or of the sensor device,
 wherein the data is transmitted by the second communication interface directly between the controller and/or the sensor device and a portable communication appliance at least in one direction by bypassing a first communication interface of a data transmission system inside the vehicle, and
 wherein the data transmission via the second communication interface causes the portable communication appliance and the controller and/or the sensor device to interact to perform at least one function which assists the driver in driving the vehicle.

* * * * *